Dec. 10, 1929.   L. H. CAMPBELL, JR., ET AL   1,738,523

VEHICLE

Filed Sept. 9, 1929   2 Sheets-Sheet 1

Inventors
Levin H. Campbell, Jr
Harry A. Knox
By W. N. Roach
Attorney

Dec. 10, 1929.  L. H. CAMPBELL, JR., ET AL  1,738,523
VEHICLE
Filed Sept. 9, 1929  2 Sheets-Sheet 2

INVENTORS
Levin H. Campbell, Jr
Harry A. Knox
BY W. M. Roach
ATTORNEY

Patented Dec. 10, 1929

1,738,523

UNITED STATES PATENT OFFICE

LEVIN H. CAMPBELL, JR., OF NEW YORK, N. Y., AND HARRY A. KNOX, OF DAVENPORT, IOWA, ASSIGNORS TO SECRETARY OF WAR OF THE UNITED STATES OF AMERICA

VEHICLE

Application filed September 9, 1929. Serial No. 391,353.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to us of any royalty thereon.

This invention relates to a vehicle particularly designed for transporting troops.

The machine gun and automatic rifle by reason of their high rate of fire and the flexibility of their employment are capable of providing a virtually impenetrable defense of an area. In order that gun crews may be quickly and safely conducted to their positions either in an advance, holding or withdrawal action it is proposed to provide an armored track laying vehicle, having a large cruising radius, capable of negotiating difficult terrain, and arranged to readily take on and discharge the gun crew and its material in the face of opposition.

The vehicle is characterized by a novel arrangement of the engine, passenger and cargo compartments designed to afford sufficient protection for the purpose in view while maintaining the weight at a minimum.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein.

Figure 1:
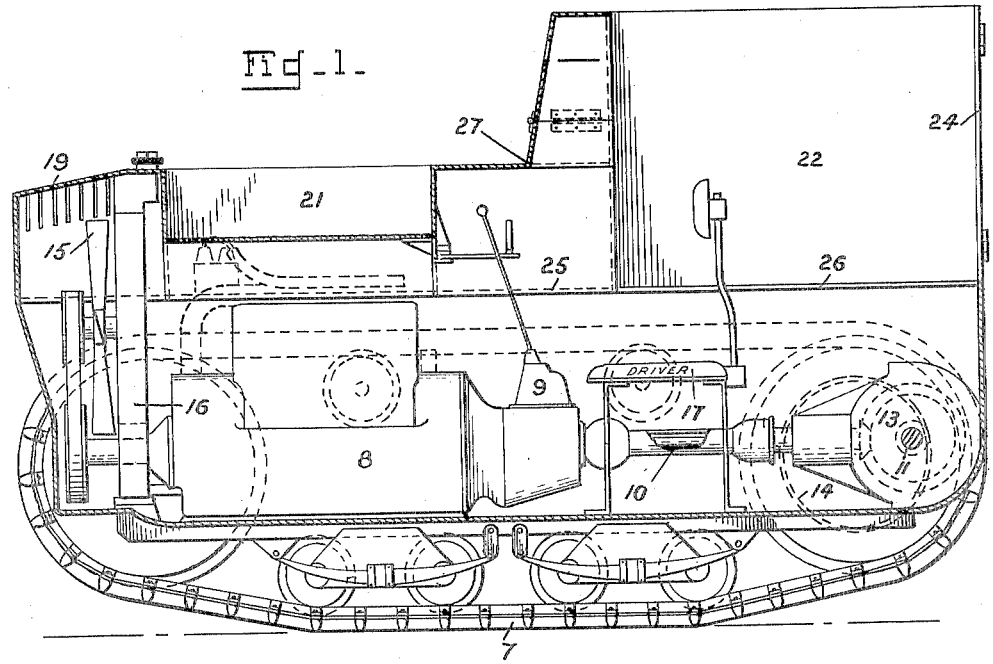
Fig. 1 is a view partly in side elevation and partly in section of the improved vehicle.
Figure 2:
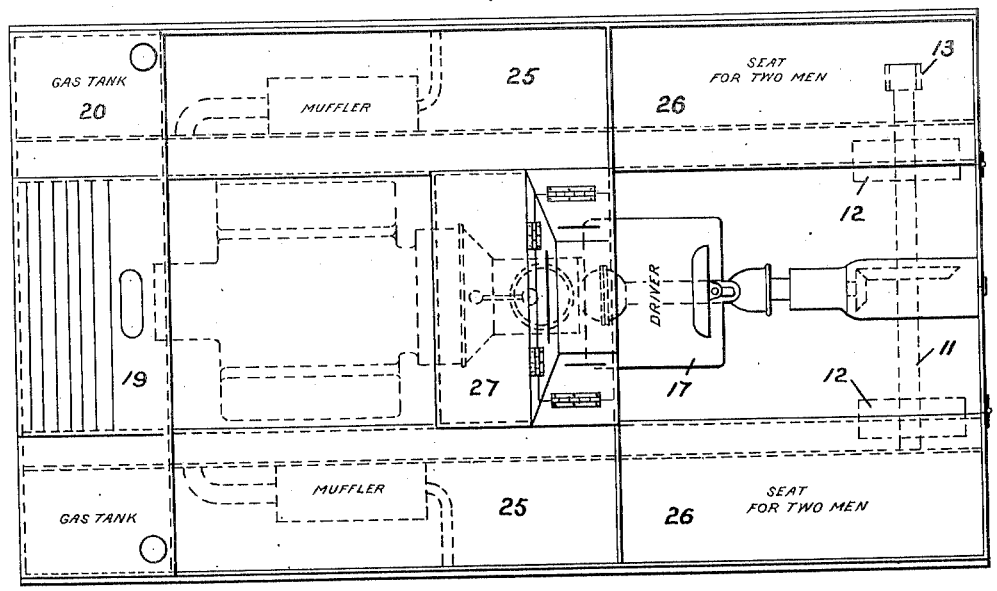
Fig. 2 is a plan view thereof.

Referring to the drawing by numerals of reference:

The vehicle comprises an armor plate body, the main or lower portion 6 of which is disposed between and supported by a pair of track laying units 7. The main body carries and encloses a power plant 8 which is a standard internal combustion engine with gear shift transmission 9 transmitting power through an enclosed propeller shaft 10 raised above the floor of the body to the rear axle 11. A steering clutch 12 is carried on each half of the axle within the main body and the extremities of the axle extending through the side walls of the body mount a pinion 13 internally engaging drive sprockets 14 of the track laying units.

A fan 15 is positioned in the foremost end of the main body in front of the radiator 16 and induces a circulation of air from rear to front so that the seat 17 for the operator may be placed directly in rear of the motor.

Figure 3:
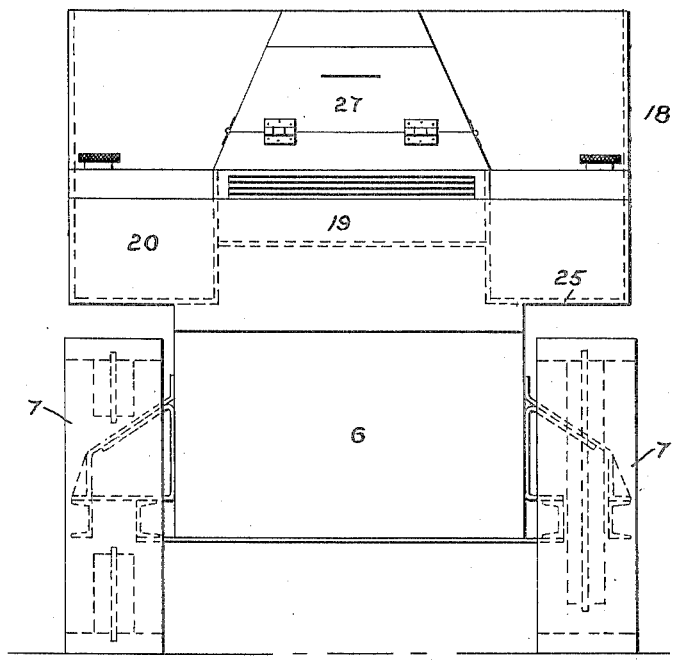
Fig. 3 is a view in front elevation.
Figure 4:
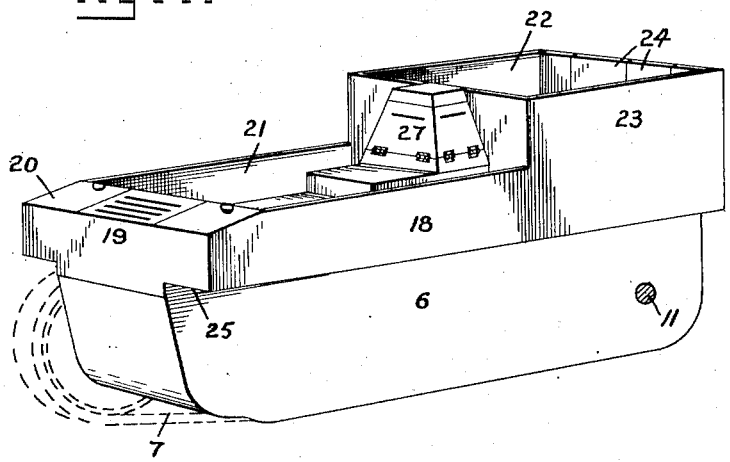
Fig. 4 is a perspective view of the body of the vehicle.

The upper structure 18 of the body comprising that part disposed above the track laying units is extended laterally to overlie these units as clearly shown in Fig. 3. The forward portion of the upper structures 18 provides a covering 19 for the radiator and fan while at either side thereof are fuel tanks 20. The portion above the power plant constitutes a cargo compartment 21 which may be utilized to carry auxiliary equipment such as batteries, tools and the like.

The rear half of the vehicle forms a passenger compartment 22 whose walls 23 rise above the cargo compartment to afford protection to the occupants. One of the walls, preferably at the rear contains hinged doors 24 to facilitate the boarding and discharge of passengers. The floor 25 of the laterally extending portions of the upper structure overlie the track laying units throughout their length and provide seats 26 for the passengers in the compartment 22.

The front wall of the compartment 22 is modified centrally to include a conning tower 27 for the operator. The arrangement is particularly favorable for the positioning of the operator and is convenient in the establishment of the passenger compartment.

Vehicles of this general character will be required in large numbers and must be capable of being put in mass production upon short notice. Accordingly the essential requirements demand that it be of simple design, and readily fabricated from articles of commercial industry.

We claim:

1. A vehicle including a main body, a track laying unit at each side thereof, a power unit on the floor of the main body, an operator's seat directly in rear of the power unit, a radiator in front of the power unit, a fan in front of the radiator arranged to draw air over the power unit from rear to front, an upper body structure extending across the track laying units and having a fan covering and fuel tanks at its front, a cargo compartment over the power unit and track-laying units, and a rear passenger compartment opening into the main body, seats in the passenger compartment being continuous with that part of the floor of the cargo compartment which overlies the track laying units, a conning tower integral with the front wall of the passenger compartment and hinged doors in the rear wall of said compartment.

2. A vehicle including a main body, a track laying unit at each side thereof, a power unit on the floor of the main body, an operator's seat directly in rear of the power unit, an upper body structure extending across the track laying units and having a fan covering and fuel tanks at its front, a cargo compartment over the power unit and track-laying units, and a rear passenger compartment opening into the main body, seats in the passenger compartment being continuous with that part of the floor of the cargo compartment which overlies the track laying units, a conning tower integral with the front wall of the passenger compartment and hinged doors in the rear wall of said compartment.

3. A vehicle including a main body, a track laying unit at each side thereof, a power unit on the floor of the main body, an operator's seat directly in rear of the power unit, a cargo compartment over the power unit and track-laying units, and a rear passenger compartment opening into the main body, seats in the passenger compartment being continuous with that part of the floor of the cargo compartment which overlies the track laying units, a conning tower integral with the front wall of the passenger compartment and hinged doors in the rear wall of said compartment.

4. A vehicle including a main body, a track laying unit at each side thereof, a track driving power unit and control unit within the main body, a cover over the power unit and track-laying units forming a cargo compartment, a passenger compartment established in the rear of the main body and having walls rising above the cargo compartment, side seats in the passenger compartment continuous with the floor of the cargo compartment, a conning tower in the front walls of the passenger compartment, and a door for the passenger compartment.

LEVIN H. CAMPBELL, Jr.
HARRY A. KNOX.